July 30, 1929.   H. F. PATTON   1,722,965
WELL STRAINER
Filed June 8, 1927   2 Sheets-Sheet 1
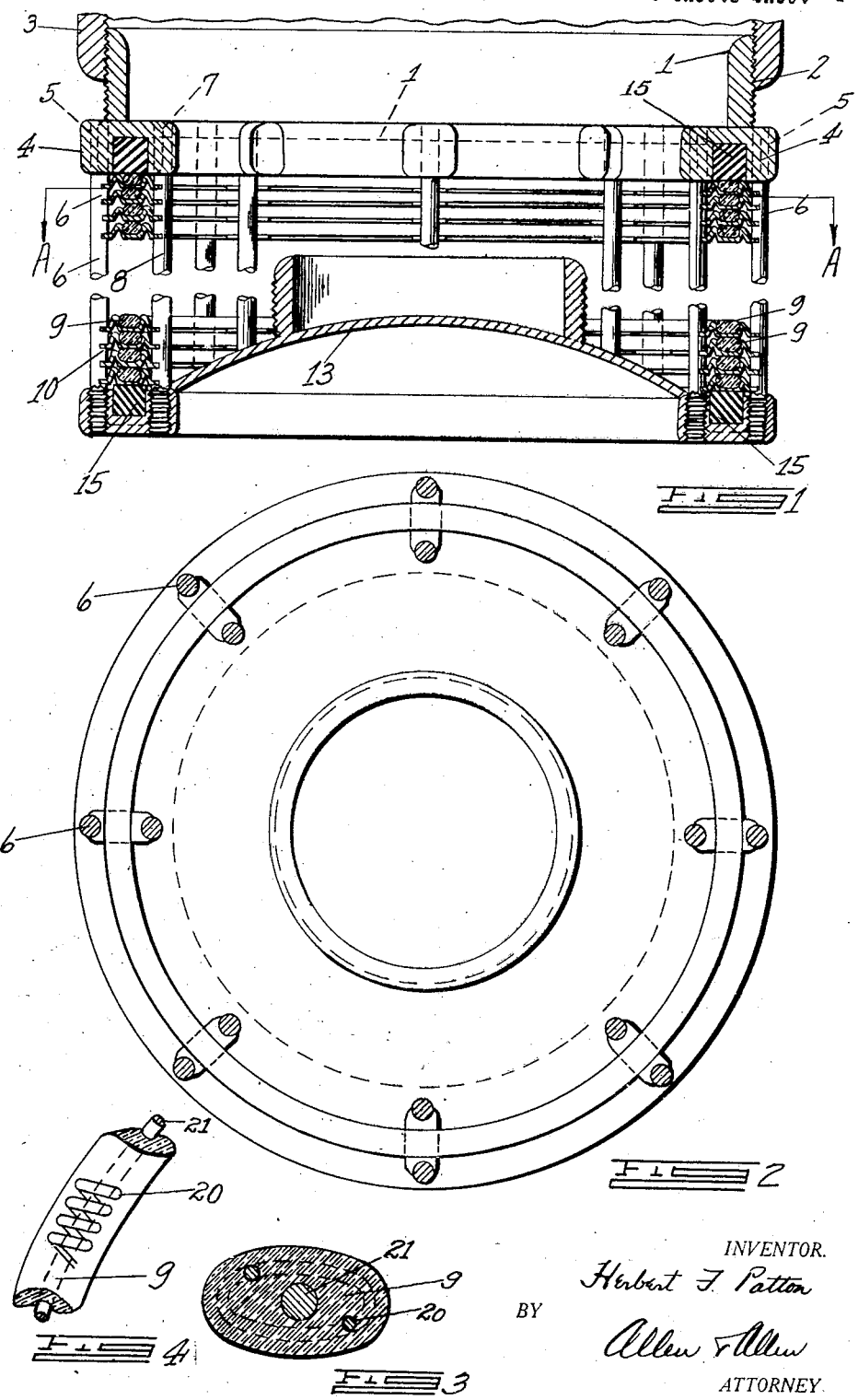

July 30, 1929.  H. F. PATTON  1,722,965
WELL STRAINER
Filed June 8, 1927   2 Sheets-Sheet 2
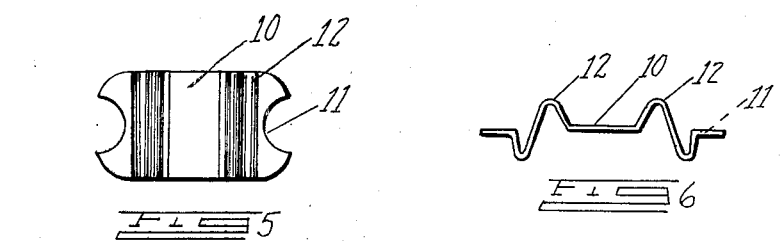
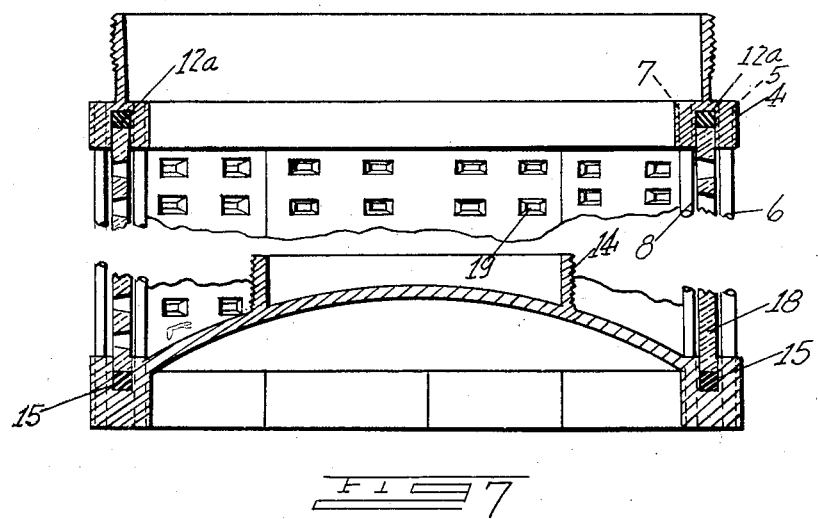
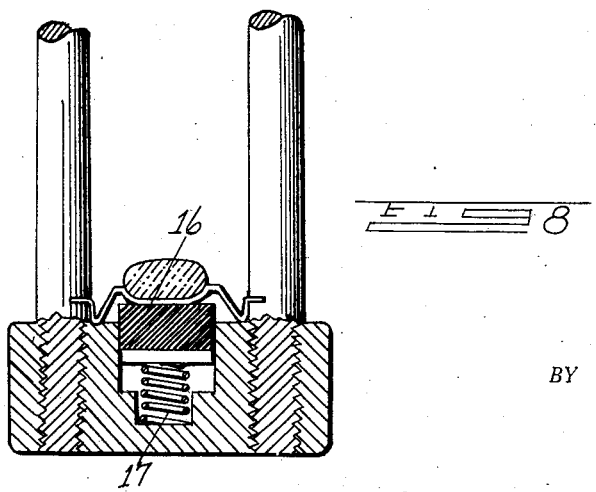
INVENTOR.
Herbert F. Patton
BY
Allen & Allen
ATTORNEY.

Patented July 30, 1929.

1,722,965

UNITED STATES PATENT OFFICE.

HERBERT F. PATTON, OF LAWRENCEBURG, INDIANA, ASSIGNOR TO A. D. COOK, INC., OF LAWRENCEBURG, INDIANA, A CORPORATION OF INDIANA.

WELL STRAINER.

Application filed June 8, 1927. Serial No. 197,456.

My invention relates to well strainers, and particularly to what are known in the art as deep well strainers which are used for making sand tight joints with well casings, or by being flanged or welded to well casings, or either with lead rings directly attached thereto, or with specially threaded collars which may be screwed to the well casings.

It is the object of my invention to make a well strainer which will be non-corrodible and resistant to galvanic and electrolytic action. For this purpose I propose to use glass rings or glass parts for providing the filtering means, and to so support the glass parts, and to so resiliently insulate them, that the shocks and jars to which they may be subjected during use will not tend to fracture them.

The use of glass for deep well strainers would ordinarily occur to a person skilled in the art as desirable because of its resistance to galvanic corrosion and abrading action, but heretofore, to the best of my knowledge and belief, the use of glass has been considered impossible due to its fragile nature. In my new well strainer it is my object to support glass parts so that there will be no appreciably greater likelihood of fracture than would occur in a metal strainer. It is my thought, therefore, that in my new structure I have made a contribution to the art of no inconsiderable importance.

The above noted objects and others to which reference will be made during the ensuing disclosure, I accomplish by that certain arrangement and combination of parts of which I have shown several preferred embodiments.

In the drawings:—

Figure 1 is a longitudinal section through a strainer in which the filtering means is provided by a series of glass rings which are oval in cross section.

Figure 2 is a horizontal section of a strainer such as is shown in Figure 1, taken in the position indicated by the lines A—A.

Figure 3 is an enlarged sectional view of a glass ring such as I employ in the embodiment shown in Figures 1 and 2, showing a metallic wire reinforcement which may be inserted in the glass during the molding operation.

Figure 4 is a side elevation of a portion of a glass ring such as is shown in Figure 3.

Figure 5 is a plan view of a preferred type of resilient clip which I employ for interspacing and resiliently supporting the glass rings.

Figure 6 is a side elevation of the clip shown in Figure 5.

Figure 7 shows a longitudinal section of a modified type of strainer in which the straining means are molded in a single hollow piece of hexagonal shape with filtration holes in the walls of the piece.

Figure 8 shows a fragmentary view of a modified type of support for the hollow piece or rings against the headers at the ends of the strainer assembly.

The strainer which I have illustrated has as its support at the top, a header or bushing 1 which is usually externally threaded as indicated at 2 so that the strainer may be attached to a coupling in the well casing such as is shown at 3. The lower portion of the header is flanged as indicated at 4 with the outer periphery of the flange of such size as to substantially correspond with the outer periphery of the casing.

The flange of the header is provided with a series of circumferentially interspaced holes 5 for enclosing the outer tie rods 6 which support the strainer and a series of interspaced holes 7 which support the inner tie rods 8 are also indicated. In the first form of the invention illustrated in Figure 1, I have employed a series of glass rings 9 of oval shape which are interspaced one from another by the resilient clips 10. The clips which are illustrated in Figures 5 and 6 are made from thin metallic strips having half round indentations 11 at the ends which engage the tie rods. Each clip has an upwardly bent portion 12 intermediate the ends which acts as a seat for the curved side wall of a glass ring and also provides a resilient support for the ring which will allow each ring to give individually or in groups.

The top ring is preferably mounted without a clip above it, and I have provided a resilient pad 12ª of rubber or some other suitable material which the upper side of the top glass ring of the series will engage. This provides a resilient cushion for the top ring. The base of the strainer has a header also which may be externally threaded in a similar manner as the top, or it may be made plain, as indicated in Figure 1. I have also found it convenient to provide a bowl-like bottom 13 which has an externally threaded portion 14 extending upwardly for attachment to a pipe of lesser diameter than the well casing.

The bottom of the assembly is provided with resilient bumpers 15 which seat the lower surface of the bottom ring and also serve as shock absorbers. It is also within the scope of my invention to provide spring seated bumpers such as I have indicated in Figure 8 in which the resilient block 16 has spring 17 which press the block upwardly against the lowermost glass ring. In the spring pressed type of bumper or shock absorber, it is sometimes feasible to provide a non-resilient block as any jar on the rings will be taken up by the springs.

In Figure 7 I have shown a modified type of strainer cylinder which is composed of a glass cylinder 18 having filtering apertures 19 through which the liquid is drawn into the interior of the strainer. The apertures may be formed in the tubular hexagonal hollow member during its manufacture. While the modification shown in Figure 7 does not require clips it is essential that the resilient shock absorbing blocks in the headers be employed, as otherwise the glass walls might be subjected to a sudden strain and crack or break.

The tie rods which are necessary for both types of strainers serve not only to support the glass rings or hollow members, but they also serve as guards to prevent both external and internal fracture by warding off the engagement of any matter which might break the glass either from the outside or the inside.

In the first form of the invention illustrated and described, it should be apparent that the filtering apertures are caused by the interspacing between the clips which support the glass rings and, in accordance with the particular requirements for the strainer, clips of greater or less thickness may be provided.

In order to strengthen the glass rings I may have inserted during the molding or pressing of the rings spirally wound wire such as is indicated in Figures 3 and 4 at 20, and I may also have a reinforcing core 21 of wire which lies within the spiral coils as indicated.

I have not shown more than one particular shape of ring or tubular filtering member, but it should be evident that variations in size and shape may be made without departing from the principle of my invention. Each ring forms with an adjacent ring a straining unit, the liquid to be filtered being sucked in between the straining units.

Having thus described my invention what I claim as new and desire to secure by Letters Patent is:—

1. In a well strainer, a plurality of glass rings resiliently bound together.

2. In a well strainer, a plurality of glass rings resiliently bound together, said strainer having end supports with tie rods extending therebetween.

3. A well strainer, having a plurality of glass rings resiliently bound together, said strainer having end supports with tie rods extending therebetween, and said rings interspaced from said tie rods.

4. In a well stainer, a plurality of glass rings resiliently bound together, said strainer having end supports with tie rods extending therebetween, and said rings interspaced from said tie rods, and interspaced one from another by interspaced clips provided with means for engaging said tie rods.

5. In a deep well strainer assembly, a plurality of reinforced glass rings, end supports with means extending between the ends providing a substantially rigid connection therebetween, and said discs interspaced one from another with means for interspacing same engaging said first noted means, and resilient means for absorbing shocks between said end supports and the top face of the upper disc and the bottom face of the lower disc.

6. In a deep well strainer assembly, a plurality of reinforced glass rings, end supports with means extending between the ends providing a substantially rigid connection therebetween, and said discs interspaced one from another with means for interspacing same engaging said first noted means, said means for interspacing said discs comprising clips having contoured portions at the ends for engaging said first noted means, and portions of the clips having U-shaped bent portions for permitting a limited range of movement between the respective discs.

HERBERT F. PATTON.